United States Patent [19]

Russo

[11] 4,315,314

[45] Feb. 9, 1982

[54] PRIORITY VECTORED INTERRUPT HAVING MEANS TO SUPPLY BRANCH ADDRESS DIRECTLY

[75] Inventor: Paul M. Russo, Princeton, N.J.

[73] Assignee: RCA Corporation, New York, N.Y.

[21] Appl. No.: 105,121

[22] Filed: Dec. 19, 1979

Related U.S. Application Data

[63] Continuation-in-part of Ser. No. 865,796, Dec. 30, 1977, abandoned.

[51] Int. Cl.³ .............................................. G06F 9/42
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,497,630 | 2/1970 | Lucas et al. | 364/900 |
| 3,599,176 | 10/1971 | Cordero, Jr. et al. | 364/200 |
| 3,675,214 | 7/1972 | Ellis et al. | 364/200 |
| 3,757,307 | 9/1973 | Cosserat et al. | 364/200 |
| 3,905,025 | 9/1975 | Davis et al. | 364/200 |
| 3,988,719 | 10/1976 | Whitby et al. | 364/200 |
| 4,000,487 | 12/1976 | Patterson et al. | 364/200 |
| 4,090,238 | 3/1978 | Russo | 364/200 |
| 4,156,905 | 5/1979 | Fassbender | 364/900 |

FOREIGN PATENT DOCUMENTS 1471136 6/1977 United Kingdom .
1491719 11/1977 United Kingdom .

OTHER PUBLICATIONS

*Preliminary Data,* CDP 1802D and CDP 1802DC-RCA, File No. 1023, Aug. '77, pp. 1–21.
*Digital Integrated Circuits,* COS/MOS 8-Bit Priority Encoder, File No. 876, Sep. '76, pp. 1, 3, 6–8.
*Digital Computer System Principles*-H. Hezlerman, McGraw-Hill, 1967, pp. 350–355.

*Primary Examiner*—Harvey E. Springborn
*Attorney, Agent, or Firm*—Samuel Cohen; Robert L. Troike; Donald W. Phillion

[57] ABSTRACT

In a computer system, a struture uses a method for rapidly accessing and executing a sub-routine selected in response to a service request from an external source. The system provides a storage unit containing the addresses of the sub-routines called for by the service requests, with the addresses of the sub-routine being identified by the received service requests. Also provided is a register containing the address of a given instruction and control logic responsive to a received service request to enable the register to become the main program counter and thereby point to the given instruction. The control logic responds to the given instruction to alter the contents of the register to a predetermined value. A decoder responds to the altered contents of the register to concurrently disable the main memory of the system and to enable the storage unit which then supplies the address of the selected sub-routine to the control logic while the main memory is disabled. The control logic then loads the requested sub-routine address into the register which acts as the program counter for the execution of the selected sub-routine.

8 Claims, 4 Drawing Figures

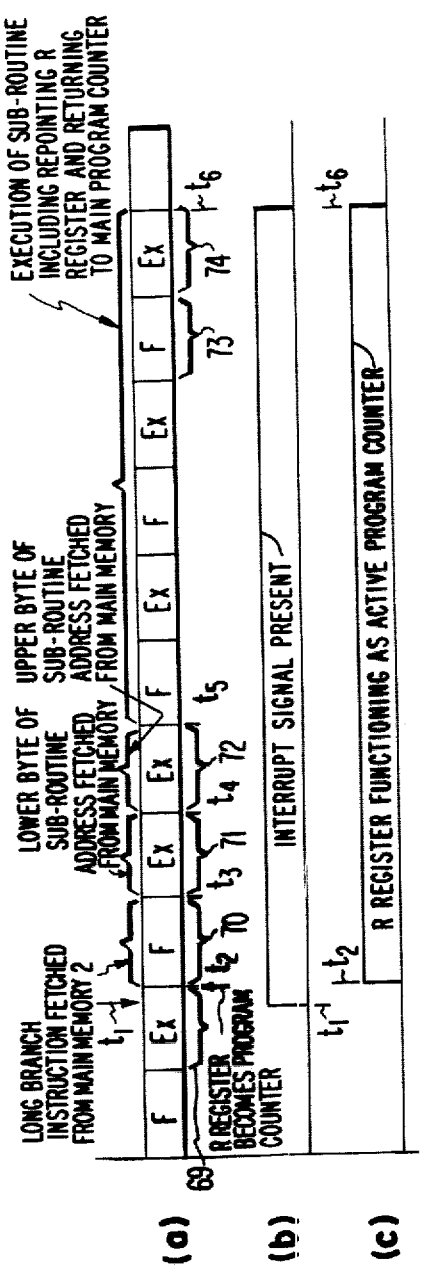
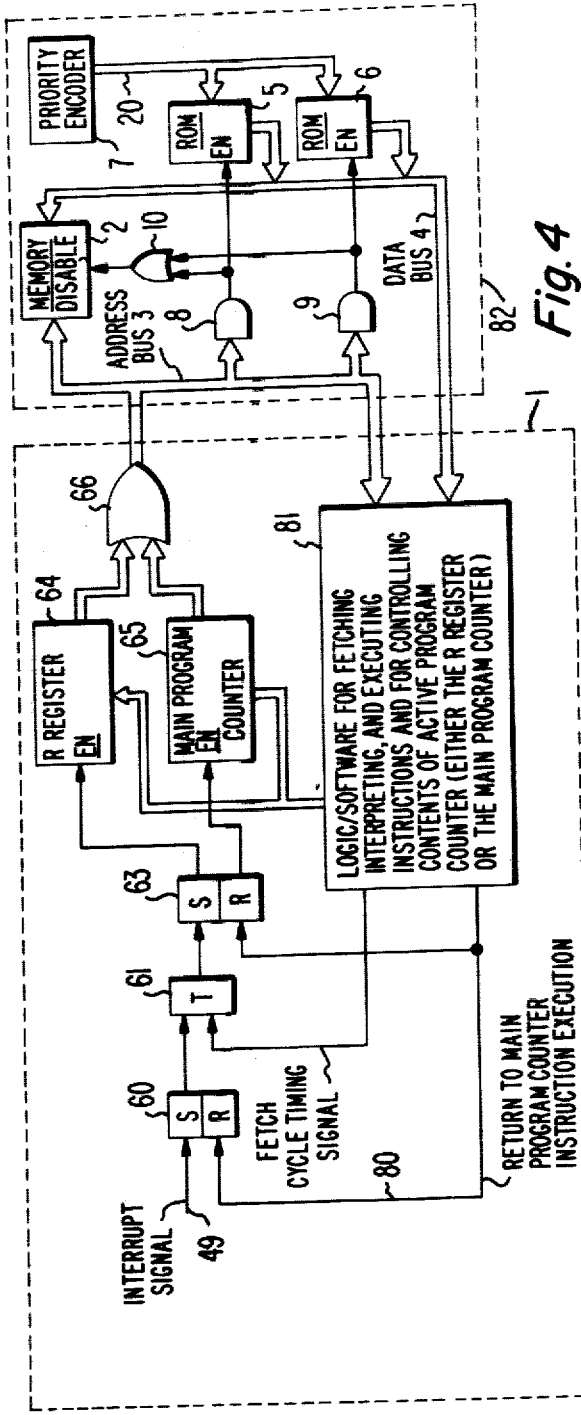
Fig. 3
Fig. 4

PRIORITY VECTORED INTERRUPT HAVING MEANS TO SUPPLY BRANCH ADDRESS DIRECTLY

This a continuation-in-part of abandoned U.S. application Ser. No. 865,796 filed Dec. 30, 1977, by Paul M. Russo.

This invention relates generally to stored program digital computers having sub-routines and an interrupt facility and more particularly to structure for very fast accessing of such sub-routines in response to interrupt signals.

In the stored program digital computer art, an interrupt means a suspension, or break in the normal sequence of executing programmed instructions, usually in response to an external asynchronous signal causing the processor to branch to a different place in the memory and to execute a new sequence of instructions. Usually, the program interrupted is continued after the new sequence of instructions, often referred to as an interrupt service subroutine, is completed.

Peripheral devices, such as discs, tapes, drums, or keyboards providing means for manual entry of data, operate at speeds which are very slow compared to the processor's operating speed. Interrupts allow the processor to execute instructions while waiting to service the peripheral devices. The servicing required by the devices includes providing data to be stored by the devices, accepting data read from the devices, or controlling the device's operation.

Processors usually have one or only a few interrupt request input terminals. When there are more devices than interrupt request input terminals the service request signals are usually combined, such as by using OR gates, to provide the interrupt request signal. Activation of the interrupt signal usually causes the processor to first branch to a sub-routine that must determine which device caused the interrupt signal and to then branch to the service sub-routine for servicing the interrupt device. Each device normally requires a separate, unique sub-routine. One prior art technique for determining which device out of several possible devices caused an interrupt is called polling, usually done by a dedicated sub-routine, where each service request line is tested in turn to identify the interrupting device or where each device supplied an identifying signal such as a unique flag signal that can be sensed by conditional program branch instructions.

A priority interrupt system is used in systems having some devices that must be serviced at a faster rate than others. For example, a high-speed magnetic tape reader must be serviced more frequently and more quickly than a paper tape reader because the magnetic data rate is greater and therefore, the allowable buffer (waiting) time is shorter. In a priority interrupt system, the problem is one of determining not only which device requested ann interrupt but also which one of several concurrently interrupting devices has the highest priority and should therefore be serviced first.

A vectored interrupt is an interrupt providing one of a plurality of responses to the interrupt signal, usually using several interrupt request input terminals, each corresponding to a particular response. The sub-routine described above to scan or to poll the possible sources of interrupt and to determine from the results which sub-routine or program branch should be executed in a software-implemented vectored interrupt. Since the polling sub-routine is programmed to poll the request inputs in a certain order, it also implies a priority hierarchy scheme.

Systems utilizing interrupts require substantial software support which increase the processor time required for priority vectored interrupts. In microprocessors, where the instructions are usually more basic than in larger machines, many instructions may be required to perform priority vectored interrupt servicing. For a more detailed discussion of interrupt processing, see, for example, "Digital Computer System principles," by H. Hellerman, (McGraw-Hill, 1967) pages 350–355.

In accordance with a preferred form of the invention there is provided, in a computer system having a main memory containing a main program, a plurality of sub-routines, a main program counter, and a storage unit containing the addresses of sub-routines which are called for by service requests received from external sources, such as peripheral devices, with each sub-routine address being defined by the service request of the requesting source. There is further provided a register containing a given instruction address and control logic responsive to an interrupt signal supplied from an external source, along with a service request, to enable said register to replace the main program counter of the system and to then point to said given instruction for subsequent fetching and execution thereof. The control logic is further responsive to said given instruction to alter the contents of said register to a given value. A decoder is responsive to said given value in said register to disable said main memory and to supply an enabling signal to said storage unit which then responds to a service request to supply the address of the requested sub-routine to the control logic while said main memory is disabled. The control lgoic loads said requested sub-routine address into said register which responds thereto to act as the program counter for the execution of the requested sub-routine.

FIG. 3, including a-c, is a set of timing bar waveforms showing the time relation between various steps in the operation of the invention; and FIG. 4 is a more detailed block and logic diagram of the invention.

Figure 1:
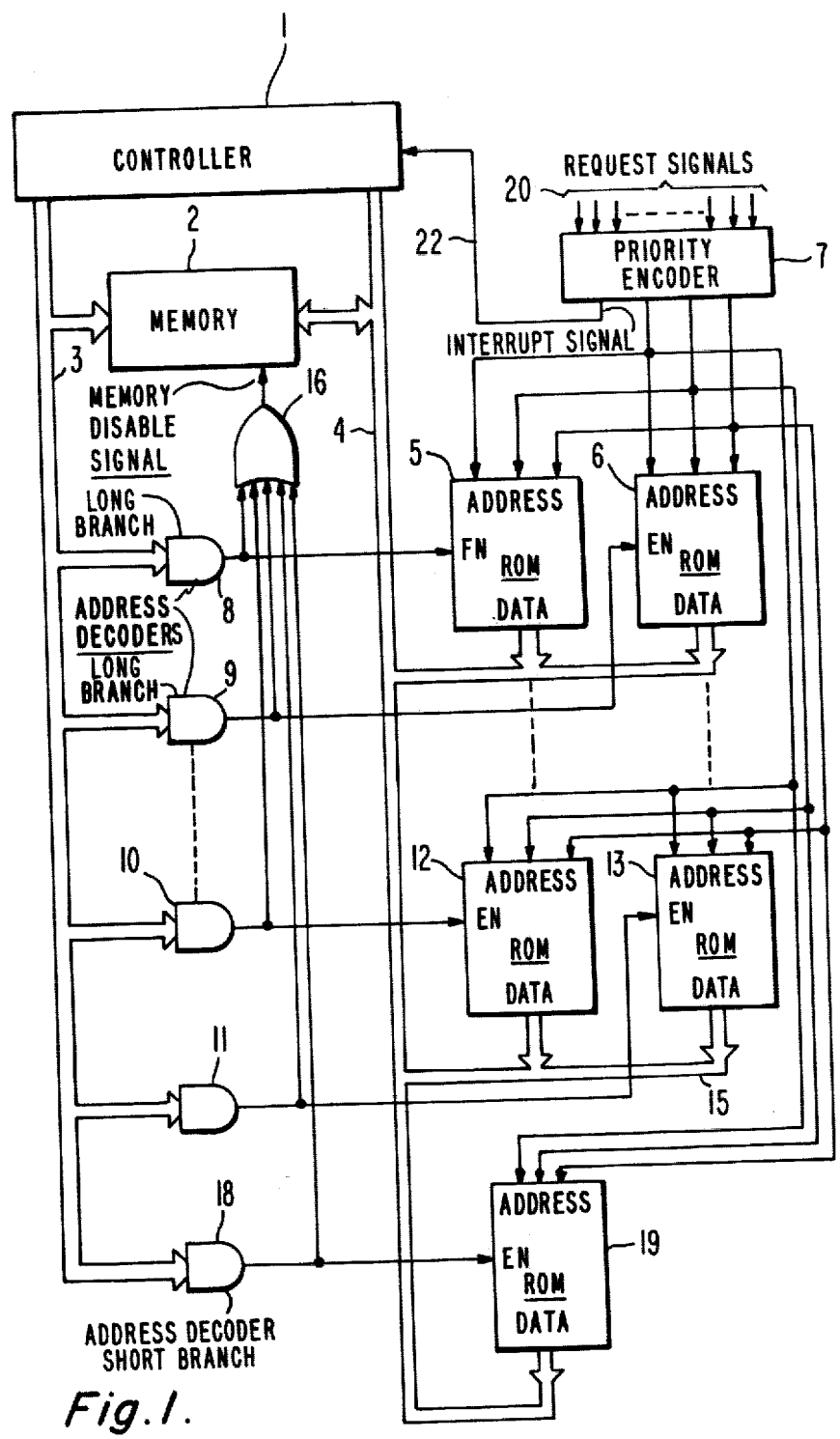
FIG. 1 is a combination block and logic diagram of the invention.

The controller 1 in FIG. 1 executes (processes) preprogrammed instructions in sequence. The particular instructions to be executed depend on the purpose for which the program is written and the form of the instructions themselves depend on the particular processor being employed in controller 1. For purposes of description, the COSMAC microprocessor CDP1802 (RCA Corporation) is referenced herein to furnish specific examples of various functions. It is understood, however, that other processors or computers using instructions having different designations and names can also be employed to practice the invention.

The operation of most computers, including microprocessors, involves two classes of timing cycles. The first class is employed to fetch or retrieve the instruction to be executed, usually from an associated main memory 2 of FIG. 1. A particular register in the processor is used as a program counter which supplies address signals via an address bus 3 to memory 2. In response to the address signals and appropriate timing signals from controller 1, the memory 2 fetches the instruction to be executed and gates it to data bus 4. In controller 1, the fetched instruction is stored in appropriate registers for execution.

The second class of timing cycles is employed to execute the instruction fetched from memory by the first class of timing cycles. Each instruction comprises an operation portion and an address portion. The operation portion designates the basic operation to be performed, such as adding, subtracting, moving, storing, and the like. The address portion of the instructions designates a location or locations from which operands are to be fetched or performs an accessory function such as modifying the operation designated in the operation portion.

All processors include an instruction of the program branch type. The operation portion of the instruction identifies the instruction and the address portion usually designates the address to which the program counter is to be pointed to execute a different sequence of instructions. Sometimes the operation portion of the instruction indicates by its unique code that the program branch is to occur only if certain conditions exist. Other program branches are unconditional, i.e., they are performed regardless of any other condition in the processor at the time they are being executed.

Most processors include an interrupt facility permitting the machine to respond to relatively infrequent external signals in an asynchronous manner. For example, when data is being read from (or supplied to) a peripheral device such as a paper tape reader, magnetic tape reader, magnetic drums, magnetic discs, or the like, the device cycle time for each word or character of data transferred is quite long compared to a processor cycle. More specifically, while each data transfer between a peripheral device and the processor requires a short time the time period between successive data transfers may be equal to the execution of several hundred or several thousand processor instructions. Therefore, an interrupt facility permits the processor, while executing programs, to be interrupted by an externally supplied interrupt signal when a device is ready for data transfer. In response to the externally supplied signal, the processor executes a different set of instructions (contained in a sub-routine) to service the peripheral device causing the interrupt, e.g. to effect a data transfer, and then returns to the program which was interrupted. Usually, the interrupt response entails a program branch instruction to transfer the program execution to the sub-routine.

The memory 2 is well known in the art and is addressed via address bus 3 which also carries timing signals and signals indicating whether a read or write operation is to be performed. The addressed data in memory 2 is gated onto data bus 4. The memory 2 includes a disabling means (not shown but well known in the art) which inhibits the normal operation of the memory in response to an output signal from an OR gate 16. State-of-the art memory devices include terminals to which enabling signals, commonly called chip select signals, must be supplied. In this example, as is common in many commercially available memory modules, the chip select or enabling signal is a low-level signal, i.e., a logical zero. Therefore, when the chip select signal from the OR gate 16 is low, the memory 2 operates in the usual way and when the output signal from OR gate 16 goes high, the operation of memory 2 is inhibited.

Decoding logic means such as logic decoders 8 through 11 and 18, shown in FIG. 1 as AND gates, are coupled to receive main memory address signals from address bus 3 and are responsive to particular addresses to produce ROM enabling signals and memory 2 inhibiting signals. Thus, for example, when a preselected main memory address is present on address bus 3, the decoding 8 produces a logical one output signal which enables read only memory (ROM) 5. When a second pre-determined address is on address bus 3, the decoder 9 produces a logical one output signal which enables ROM 6.

ROMs 5, 6, 12, 13 and 19 are commercially available devices which receive address signals and supply the data at the addressed locations to data bus 4 if an enable input signal (EN) is present. A ROM, as the name implies, has fixed data at each storage location which can be read from the ROM but which cannot be altered. If desired, a conventional random access memory (RAM) having a write as well as a read capability, can be employed in lieu of ROM's 5, 6, 12, 13 and 19, with pre-stored information in the addressable locations of the RAM.

The priority encoder 7 can be a commercially available device, for example, an integrated circuit type CD4532 (RCA Corporation). It receives, as its input terminals, eight request signals and in response thereto generates both an input signal indicating that at least one request signal has been received including an interrupt (INT) signal and three encoded signals identifying, in binary notation, the request signal having the highest priority. These encoded signals are herein referred to as selection signals.

An interrupt request signal can call for either a short branch or a long branch instruction to a sub-routine required to service the peripheral device originating the interrupt request signal. In the COSMAC system, as well as in other microprocessors, the short branch is defined as a branch to a sub-routine located on the same memory page as the branch instruction. A long branch is defined as branching to a sub-routine located on a different memory page from that on which the branch instruction is located. In the present invention ROM's having 8-bit words are employed in lieu of main memory to store the sub-routine addresses. To execute a long branch which requires two bytes, two ROM's, such as ROM's 5 and 6 of FIG. 1, are required. The selection, i.e., the enablement, of the correct ROM's (such as ROM's 5 and 6), whose memory locations contain the page and line selection corresponding to the page and line of a memory, is effected by two consecutive bytes supplied to address decoders 8 and 9 from a source, (the R register of FIG. 4) to be described below.

However, before generally describing such source it should first be specifically noted that the contents of the memory locations of one of the ROM's such as ROM 5, contains what corresponds to the addresses of pages in the above-described prior art while the contents of the memory locations of another ROM, such as ROM 6, contains what corresponds to the contents of the page lines of the prior art e.g., the specific address of the desired sub-routine.

In the present invention, however, the specific addresses (pages and lines) of those memory locations in ROM's 5 and 6 which contain the complete, desired sub-routine addresses are supplied from priority encoder 7.

In operation of the system of FIG. 1, the controller 1 responds to an interrupt signal on lead 22 from priority encoder 7 to cause a register therein, (herein defined as the R register and shown in more detail in FIG. 4 as register 64) to become the program counter. The R register points to the address of a particular instruction such as a branch instruction, which is fetched from memory and decoded by control logic in controller 1. Such branch instruction indicates whether the sub-routine pointed to by the program counter, now the R register, requires a short branch or a long branch. If it is a long branch, the R register is incremented by one to point to the next main program address which is detected by either of logic decoders 8 or 10 of FIG. 1, depending on the contents of the R register. Assume logic decoder 8 detects the contents of the R register to enable ROM 5 which responds thereto to supply the lower order 8-bit byte address to controller 1 via data bus 4. This lower order byte defines the word location, but not the page, on which the desired sub-routine is located.

The control logic of controller 1 then causes the R register to again be incremented by one to point to the next occurring address in the main program. Such next occurring address is detected by logic decoder 9 which responds thereto to enable ROM 6. ROM 6 responds to such enabling to supply the higher order 8-bit byte to controller 1 via bus 4. Such higher order bit defines the memory page on which the desired sub-routine is located.

The two bytes supplied from ROMs 5 and 6 are then loaded into the R register by controller 1 so that the R register now points to the address of the desired sub-routine.

The particular address bytes supplied by ROMs 5 and 6 are determined by the encoded output signal of priority encoder 7 which output signal is generated from the interrupt request signals supplied to the input terminals 20 of encoder 7. The priority encoder 7 responds to such interrupt request signals to address those addresses of ROMs 5 and 6 which contain the addresses of the higher and lower bytes defining the sub-routine in main memory required to service the particular peripheral device supplying the interrupt request signals to ROMs 5 and 6.

As discussed previously each time logic means, such as logic decoders 8 or 9, supplies a signal to ROMs, such as ROM 5 and 6, a signal is also supplied through OR gate 16 to disable memory 2, thereby substituting the desired sub-routine address supplied from ROMs 5 and 6 for the sub-routine address which would normally be supplied from memory 2 in a branch operation not resulting from an interrupt request.

Sometimes a request from a given peripheral device will require a different servicing routine than will be required at other times. To meet the foregoing situation additional pairs of ROMs, such as ROMs 12 and 13 and associated logic decoders 10 and 11, are provided. To activate logic decoders 10 and 11 it is necessary to change the contents of the R register to point to a second, long branch instruction different from that required to energize decoders 8 and 9. Thus, when the R register is so changed and an interrupt signal occurs, the R register will point to the second branch instruction which will be fetched into the controller 1, decoded therein, and the R register contents altered (as by incrementing by one) to point to the address of the next instruction occurring in the main program. The logic decoder 10 will respond to such next address in the main program to enable ROM 12 which responds thereto to supply the lower order address byte of the desired service sub-routine to controller 1 via data bus 4. The R register is again incremented by one to energize the logic decoder 11 which, in turn, enables ROM 13. ROM 13 responds thereto to supply the higher order byte of the desired service sub-routine address. The lower and higher bytes of the desired sub-routine address are then loaded into the R register and the service sub-routine is executed.

It is to be noted that all of the branches resulting from a given branch instruction are either long branches or short branches; they cannot be mixed.

When the service sub-routine is on the same page as the branch instruction then, by definition, a short branch is required. As mentioned above, a short branch requires only one ROM since only the lower order byte of the address of the R register, acting as the program counter, need be changed. More specifically, when an interrupt request signal is received by priority encoder 7 requiring a short branch the R register, which has been previously loaded by means of software, will point to a short branch instruction. When the short branch instruction is fetched the controller 1 decodes such instruction and determines that the branch is in fact a short branch, requiring only the fetching of a single, low order byte from ROM 19. The R register is then incremented by one to energize logic means 18, thereby enabling ROM 19 which responds thereto to supply the low order address byte of the desired service sub-routine. Such low order address byte is supplied to controller 1 via data bus 4 and then loaded into the lower byte position of the two byte contents of the R register. The R register then points to the address of the desired service sub-routine which is executed with the R register functioning as the program counter.

At the end of each service sub-routine, the R register is reset to a given value which points it to the address of the next desired branch instruction. The main program counter (shown in FIG. 4) is then made the active program counter and the operation is then returned to the main program whose execution then continues under the control of the main program counter.

Figure 2:
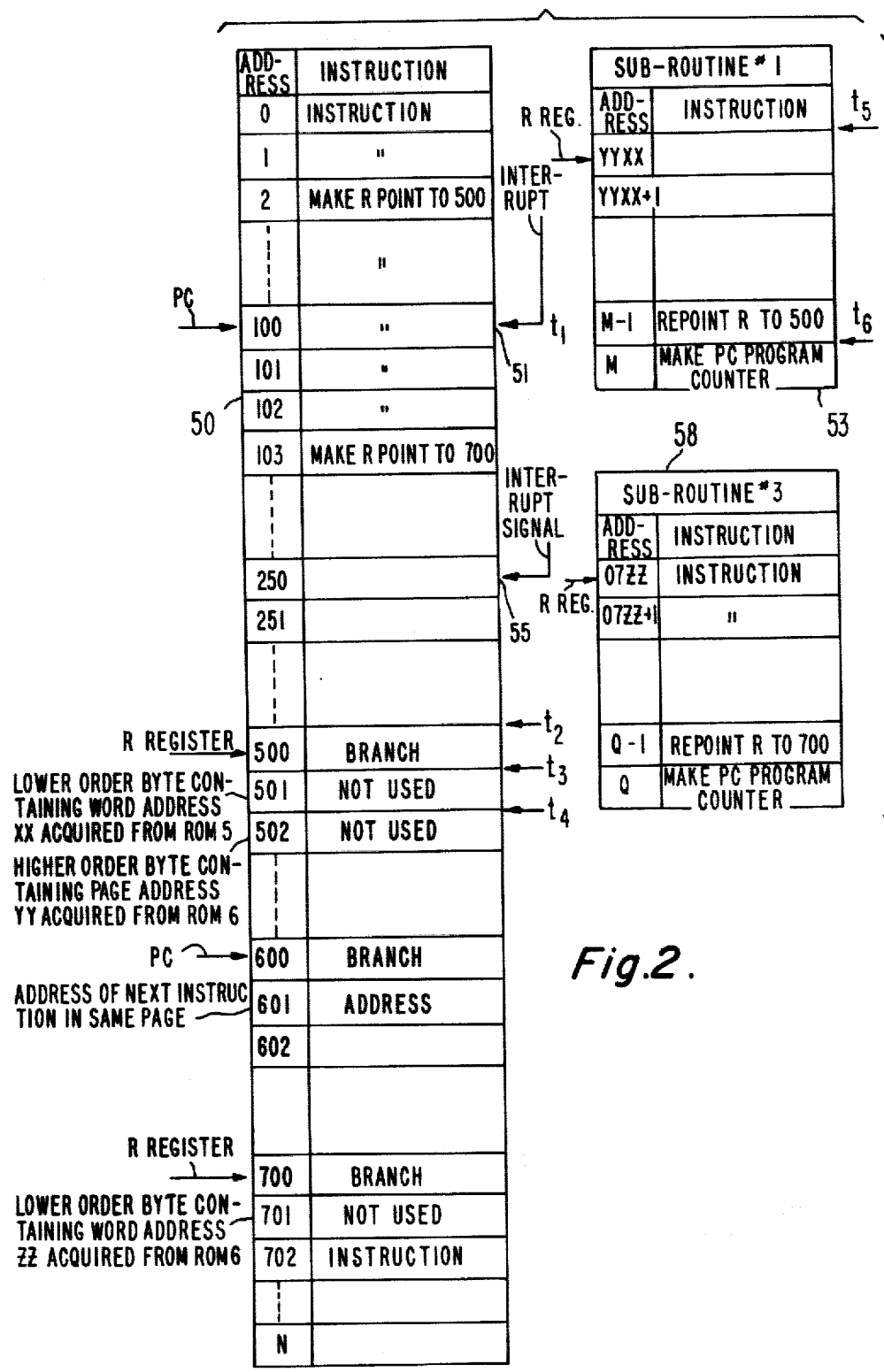
FIG. 2 shows a main program and two sub-routines in chart form which functionally illustrate the invention.

Reference is now made to FIG. 2 which shows in chart form the main program of the processor and two examples of sub-routines which are executed as a result of interrupt request signals being received from peripheral devices. In main program 50 (stored in main memory 2 of FIG. 1), assume that in the execution of the instruction in address location 2 the R register is loaded to point to address 500. Then, when an interrupt signal occurs at point 51 in main memory program 50 (times $t_1-t_6$ in FIG. 2 will be discussed re FIGS. 3 and 4), the R register 64 of FIG. 4 will become the program counter and point to address 500 of the main program, as shown in FIG. 2. Address 500 contains a branch instruction which is brought into the control logic of controller 1 (FIG. 1) and determines that a long branch is required. The R register is then incremented by one to point to address 501 in the main program 50 of FIG. 2. Logic means 8 of FIG. 1 responds to the new contents of the R register to enable ROM 5 of FIG. 1 which responds thereto to supply the lower order byte xx of the desired sub-routine address to controller 1. The controller 1 then causes the R register to again be incremented by one to point to address 502 (FIG. 2) in main program 50. The logic decoder 9 of FIG. 1 responds to enable ROM 6 which, in turn, supplies the second or higher byte yy of the desired sub-routine address to controller 1 of FIG. 1 via data bus 4.

The control logic of controller 1 then loads the R register with the lower and higher order bytes of the desired sub-routine 53 (FIG. 2) into the R register so that the R register points to the starting address yyxx of such desired sub-routine 53 The R register will function as the program counter during the execution of sub-routine 53.

The last few instructions of sub-routine 53 will re-point the R register to address 500 of the main program 50 or to any other desired address. The main program counter PC (shown in logic form in FIG. 4) will again become the active program counter to cause a return to the main program 50. It is to be understood that the main program counter PC has been incremented by one during the execution of the sub-routine 53 to now point to the next address 101 in main program 50 of FIG. 2.

The main program counter PC then steps succcessively through address 101 and 102 to addresses 103 and when it reaches step 103 of the main program, the R register will be loaded to point to address 700. Subsequently, when another interrupt occurs at point 55 in the main program 50, the R register will become the active program counter and will point to address 700 in main program 50. Address 700 contains another branch instruction which is fetched into the control logic of controller 1 and decoded. Assume that this second branch instruction requires only a short branch so that only one ROM is needed. Such single ROM is identified as ROM 19 in FIG. 1. The R register is then incremented by one which activates logic means 18 of FIG. 1, thereby enabling ROM 19 to supply the lower order address byte of the desired service sub-routine to the control logic in controller 1 via bus 4. Such control logic then loads such single lower order byte into the lower byte position of the R register so that the R register points to a service sub-routine located on the same page as the short branch instruction. The higher order byte stored in the R register (such byte being defined herein as 07 and pointing to the memory page of the branch instruction) remains unchanged since the memory page is unchanged. Assuming that the address loaded into the lower byte position of the R register is address xx, the starting address of the desired sub-routine 58 of 07zz to which the R register now points.

Sub-routine 58 is executed with the R register acting at the program counter. At the end of the execution of sub-routine 58, the R register is again re-pointed to a desired branch instruction, the main PC counter resumes the program counting function, and the return to main program occurs.

Subsequently, in main program 50, the PC counter might eventually reach address 600, which contains another branch instruction. However, the branch instruction in address 600 was not reached as a result of an interrupt signal. Accordingly, the branch instruction in address 600 will be supplied to controller 1 of FIG. 1 and the primary PC register, not the R register, will be incremented by one to point to address 601. Address 601 contains the address of the desired branch location whose address will be entered into the main program counter. The main program counter will remain as the active program counter after the branch has occurred.

Referring now to FIGS. 3 and 4 there are shown respectively a timing diagram for carrying out the steps of a long branch instruction resulting from an interrupt service request signal and a logic diagram for substituting the R register as the active program counter in the system for the execution of the service sub-routine called for by the interrupt service request signal.

In the bar waveform of FIG. 3A there is shown a series of fetch and execute cycles for a number of instructions. While the time interval for each fetch and each execute cycle is shown as being the same in FIG. 3A it is to be understood that with diffferent microprocessors such time periods can be of different lengths. In bar waveforms 3A and 3B it is assumed that an interrupt signal occurs at time $t_1$ while the execute cycle is being performed.

The various times $t_1$ through $t_6$ shown in bar waveforms 3A and 3B mark the occurrence of certain events in the execution of the long branch instruction resulting from an interrupt signal (and the requested sub-routine) and are also used in the main program 50 and the sub-routine 53 of FIG. 2 to indicate the occurrence of the corresponding events in said programs 50 and 53.

Assume that an interrupt signal occurs at a time $t_1$, as shown in bar waveform 3B, while an execute cycle 69 is being performed, as shown in bar waveform 3A. It is necessary that the execute cycle be completed before the R register becomes the program counter. Such completion of execute cycle 69 occurs at time $t_2$.

The logic to accomplish the foregoing is shown in FIG. 4 wherein the interrupt signal sets flip-flop 60 via lead 49 and thereby primes TRANSMISSION gate 61 which will pass the next fetch cycle from control means 81 to set flip-flop 63. The setting of flip-flop 63 enables the R register 64 to become the active program counter and disables the main program counter 65. The contents of R register 64, which contents is the address of the long branch instruction, is supplied through OR gate 66, address bus 3, and then to main memory 2. The long branch instruction is fetched from main memory 2 and supplied to control means 81 where it is determined that the desired sub-routine address consists of two bytes which must be fetched from main memory. During the two execution cycles 71 and 72 of bar waveform 3A, the fetch instruction 70 is executed and the lower and upper bytes of the sub-routine address are fetched from main memory 2 and entered into the R register 64 of FIG. 4, which is then acting as the system program counter.

Thus, at time $T_5$, the R register 64 contains the address of the requested sub-routine and continues to act as the program counter during the execution of the sub-routines in the manner described hereinbefore. During the last few instructions of the sub-routine the R register is re-pointed to some predetermined value and the system returned to the main program counter 65 of FIG. 4. Thus, at the completion of the execution of sub-routine 53 (FIG. 2) at time $t_6$ the R register 64 ceases to be the active program counter as indicated in waveform 3C and the main program counter 65 is reactivated.

Logic for implementing the foregoing is illustrated generally in FIG. 4 wherein the return-to-main-program counter instruction supplied at the end of the sub-routine 53 (FIG. 2) is supplied via lead 80 to reset flip-flops 60 and 63, thereby disabling the interrupt signal supplied to TRANSMISSION gate 61 and also disabling the R register 64 as the active program counter and disabling the main program counter 65.

As mentioned above, the times $t_1$ through $t_6$ shown in waveforms 3A and 3B and marking the occurrence of certain events are also shown in FIG. 2 and mark the same occurrences. Thus, in the main program 50 of FIG. 2, the interrupt signal occurs at time $t_1$ followed by the fetching of the branch instruction at time $t_2$. Subsequently, at time $t_3$ and $t_4$, the lower and upper bytes of the desired sub-routine address are fetched from the ROMs 5 and 6 of FIG. 4 in response to the R register containing values which ordinarily would point to and access addresses 501 and 502 of the main program 50. However, as discussed above, the decoding means 8 and 9 respond to such values in the R register to energize ROMs 5 and 6, respectively, thereby providing the lower and upper bytes of the desired sub-routine address to the control means 81 of FIG. 4.

Subsequently, at time $t_5$, the sub-routine 53 is accessed with the R register 64 as the program counter. At time $t_6$, the execution of the sub-routine instructions is completed with the last few instructions thereof enabling the main program counter 65 and disabling the R register as program counter.

In FIG. 4 the structure within the dotted block 82 corresponds to a portion of the structure of FIG. 1 with each element thereof being identified by the same reference character as the corresponding element of FIG. 1. The logic within dotted block 1 is the general equivalent of the controller 1 of FIG. 1.

What is claimed is:

1. In a computer system comprising a main memory storage means having a main program and sub-routines, control logic means, a main program counter, and means for receiving source identifying service requests from external sources, means for accessing and executing a sub-routine requested by and in response to each service request and with said accessing and executing means comprising:
   first storage means containing first sub-routine addresses addressable by said service requests;
   register means containing a given instruction address;
   said control logic means responsive to a received service request to enable said register means to replace said main program counter as the system program counter and to point to said given instruction;
   said control logic means further comprising means responsive to the execution of said given instruction to alter the contents of said register means in a predetermined manner;
   said first storage means further comprising first enabling means and responsive to said altered contents of said register means and to said received service request for supplying the requested sub-routine address to said control logic means;
   said control logic means responsive to the reception of said requested sub-routine address to load said requested sub-routine address into said register means which responds thereto to function as the active program counter for the execution of said requested sub-routine.

2. A computer system as in claim 1 in which:
   said main memory storage means comprises a plurality of pages with each page having a plurality of word locations;
   in which said requested sub-routine address comprises a word location address portion and a page address portion;
   in which said first storage means comprises:
   word location address storage means for storing the word location address portions of the requested sub-routine addresses; and
   page address storage means for storing the page address portions of the requested sub-routine addresses;
   in which said control logic means responds to sid given instruction to successively alter the contents of said register means to first and second values; and
   in which said first enabling means comprises:
   first decoding means responsive to said first value to enable said word location address storage means to supply the word location address portion of said requested sub-routine address to said control logic means; and
   second decoding means responsive to said second value of the contents of said register means to enable said page address storage means to supply the page address portion of said requested sub-routine address to said control logic means.

3. A system as in claim 1 in which said main progem contains second and third instructions and further comprising:
   second storage means containing second sub-routine addresses accessible by said service requests;
   said control logic means comprises means for loading said register means with the address of said second instruction in response to the execution of said third instruction contained in said main program and to alter the contents of said register means in a second predetermined manner in response to the execution of said second instruction;
   said second storage means comprising second enabling means responsive to the second predetermined altered contents of said register means and to a received service request to access and supply the requested second sub-routine address to said control logic means; and
   said control logic means responsive to the reception of said requested second sub-routine address to load said requested second sub-routine into said register means which responds thereto to become the active program counter for the execution of said requested second sub-routine.

4. In a computer system comprising a main memory having a main program and sub-routines, a main program counter, and means for receiving source identifying service requests from external sources and for producing interrupt signals indicating the reception of such service requests, means for accessing and executing a predetermined requested sub-routine in response to each given service request and comprising:
   addressable storage means containing the addresses of sub-routines called for by certain service requests with the address of each sub-routine address being defined by one of said service requests;
   register means containing the address of a first branch instruction;
   control logic means responsive to one of said interrupt signals to enable said register means to replace said main program counter as the active program counter and to point to said first branch instruction,
   said control logic means further responsive to said first branch instruction to alter the contents of said register means to contain a first given value;
   decoding means responsive to said first given value to disable said main memory and to supply an enabling signal to said first addressable storage means;

said storage means being responsive to said enabling signal and to a source identifying service request to supply the address of the requested sub-routine to said processor means while said main memory is disabled;

said control logic means responsive to the reception of said requested sub-routine address to load the said requested sub-routine address into said register means which responds thereto to become the active program counter for the execution of said requested sub-routine.

5. In a computer system having control logic means, main memory means containing sub-routines, register means, a method for accessing and executing selected sub-routines in response to service requests from external sources and comprising the steps of:

storing a first group of sub-routine addresses in a first storage means;

storage a first value in said register means;

responding to each of a plurality of service requests to point to a corresponding selected sub-routine address in said first storage means;

presenting the said first value contained in said register means to said first storage means;

enabling said first storage means in response to said first value and to said each service request to supply a selected sub-routine address to said control logic means;

loading said register means with said selected sub-routine address; and executing the selected sub-routine with the said register means as the active program counter.

6. A method as in claim 5 comprising the further steps of:

storing a second group of sub-routine addresses in a second storage means;

storing a second value in said register means;

responding to each of a second plurality of service requests to point to a corresponding selected sub-routine address in said second storage means;

presenting the first value content of said register means to said second storage means;

enabling said second storage means in response to said second value and to one of said second service requests to supply a selected one of said second sub-routine addresses to said processor means;

loading said register means with said selected second sub-routine address; and executing the selected sub-routine with the said register means as the active program counter.

7. In a computer system having a control logic means, main memory means containing sub-routines, an active system program counter means and a register means, a method for accessing and executing selected sub-routines in response to service requests from external sources and comprising the steps of:

storing addresses of said sub-routines in a storage means;

storing a given instruction address in said register means;

responding to a given service request to point to a given sub-routine address in said storage means and to make said register means the active system program counter means pointing to said given instruction;

fetching and executing said given instruction;

altering the contents of said register means in response to the contents of said given instruction;

enabling said storage means in response to said altered contents and to said given service request to supply said given sub-routine address to said processor means;

loading said register means with said given sub-routine address; and executing the requested sub-routine with said register means as the active system program counter means.

8. A computer system comprising control logic means, a main memory having a main program and sub-routines, a main program counter and a register means, a method of accessing selected one of said sub-routines requested by an external source requiring services provided by a given one on said sub-routines and comprising the steps of:

storing the addresses of the sub-routines in a first addressable memory;

indetifying the address of any given sub-routine by an address identifying code supplied from the source requesting said sub-routine; storing the address of a branch instruction in a register means;

enabling said register means to become the system program counter in place of said main program counter to thereby point to said branch instruction in response to the reception of said address identifying code;

altering the contents of said register means to a given value in response to said branch instruction;

disabling said main memory in response to the said given value in said register means;

enabling the addressable memory to supply the identified address of the requested sub-routine to said control logic means;

loading the program counting register means with the address of the identified sub-routine;

executing said identified sub-routine; and returning the control of the operation of the system to the main program under control of the main program counter.

* * * * *